United States Patent [19]

Condon et al.

[11] 4,244,436
[45] Jan. 13, 1981

[54] VEHICLE WITH POWER DRIVEN SKI

[75] Inventors: Richard W. Condon, Frankfurt; Charles Stewart, Bourbonnais, both of Ill.

[73] Assignee: Roper Corporation, Kankakee, Ill.

[21] Appl. No.: 4,905

[22] Filed: Jan. 19, 1979

[51] Int. Cl.³ .......................................... B62M 27/02
[52] U.S. Cl. .................................................. 180/191
[58] Field of Search ............... 180/191, 181, 184, 185, 180/190; 305/24, 21

[56] References Cited

U.S. PATENT DOCUMENTS

| | | | |
|---|---|---|---|
| 1,056,063 | 3/1913 | Schuh | 180/185 |
| 1,065,011 | 6/1913 | Vettel | 180/191 |
| 1,631,114 | 6/1927 | Anderson | 180/191 |
| 1,650,334 | 11/1927 | Eliason | 180/191 |
| 3,221,830 | 12/1965 | Walsh | 180/190 |
| 3,304,095 | 2/1967 | Carlton | 280/609 |
| 3,853,192 | 12/1974 | Husted | 180/181 |
| 4,035,035 | 7/1977 | Husted | 180/181 |
| 4,129,193 | 12/1978 | Husted | 180/190 |

FOREIGN PATENT DOCUMENTS

2003326 8/1971 Fed. Rep. of Germany ........... 180/190

Primary Examiner—John A. Pekar
Attorney, Agent, or Firm—Fitch, Even, Tabin, Flannery & Welsh

[57] ABSTRACT

A power driven ski vehicle of the ski bob kind is driven by a power ski having a pair of running surfaces on the undersides of the power ski for sliding engagement with the snow and for supporting a substantial portion of th weight of the vehicle and rider. Each of the running surfaces is disposed intermediate an outboard turning flange, located along the outer ski edge, and a central tunnel through which a propulsion track travels. Preferably, the running surfaces are inclined in the transverse direction and their inner edges define a pair of inner reaction or turning edges parallel to the outer turning flanges. The entry and exit ends of the tunnels are configured to reduce wear of the propulsion track as it enters and exits the underside of the ski and is changing its direction of travel.

18 Claims, 9 Drawing Figures

VEHICLE WITH POWER DRIVEN SKI

This invention relates to a power drive ski and also to power driven ski cycles or vehicles, sometimes called "ski bobs", having such a power driven ski for propelling the vehicle across the snow.

Motorized ski vehicles of the ski bob type generally have a small upright frame with a front steering handlebar, which is characteristic of cycles, mounted on the upper end of a steering post which is journaled in the front end of the frame. A front steering ski is fixed to the lower end of the steering post. The rider sits on a rear seat above a rear power ski with his legs straddling a central frame portion and his feet on a crossbar located beneath the steering handlebar. The vehicle is propelled across the snow by an endless propulsion track carried by the rear ski with the lower run of the endless track engaging the snow and propelling the power ski across the snow or ice. A gasoline engine powers the propulsion track and is controlled by controls on the handlebars. Typically, the engine is quite small and lightweight and fueled by gasoline from a small gas tank carried on the vehicle frame. For instance, a small three horsepower engine and a fuel tank supply of one and one-quarter hours are typical.

These snow vehicles are considerably smaller than snowmobiles in that they usually have a single front steering ski in contrast to the usual dual steering front skis on a snowmobile and small narrow power skis rather than a very wide driving track for the typical snowmobile. Snowmobiles are self supporting and are balanced by the wide spread of their supporting surfaces in contrast to snow bobs in which the rider must maintain his balance in order to keep the snow bob upright and from tipping over. As a consequence, the stability and tracking characteristics of a ski bob is considerably different from that of the snowmobile.

Heretofore, it has been proposed to provide power driven ski bobs with a substantially planar undersurface on the power ski with the lower run of the propulsion track sliding along this planar undersurface. When the vehicle was traveling on snow or ice, the rearward portion of the vehicle's and occupant's weight was being borne by the depending cleats on the endless propulsion track and the cleat-swept area on the bottom of the power ski. These cleats were flexible, transversely extending cleats fixed at a small central area to a chain and such loading on these cleats bent the same and/or subjected the cleats to high stresses and also to high wear rates. This was because on hard ice or snow surfaces too little of the weight was being carried directly by the planar undersurface of the ski. Also, there was little guiding or stabilizing of the cleats and track. While it has been proposed to guide the cleats and track within a tunnel formed in the underside of the power ski and to provide skirts in the shape of sled-like runners along the side edges of the tunnel to take some of the load on hard surfaces, the sled runner skirts are substantially ineffectual for load bearing in soft snow and the power ski does not have the desired stability and tracking characteristics. It will be appreciated that the turning of the ski bob is akin to turning a bicycle in that it involves a shifting of the weight of the rider into the turn to shift the location of his center of gravity relative to the vehicle and thus, in turn, to change the way in which the terrain is contacted by the vehicle. While one leans into the turn on snowmobiles, the long and wide rear surface and the dual front skis provide a different stability than is found in ski bobs.

Accordingly, the present invention is directed to providing an improved tracking and turning characteristic for a rear power ski used in a ski bob thereby resulting in better control and tighter turns for the snow bob. Further, the present invention is directed to an improved load-carrying characteristic for the rear power ski so that the rider's weight on the rear portion of the vehicle need not be substantially borne by the propulsion track with the attendant wear and failure found with a heavily loaded propulsion track.

Accordingly, an object of the present invention is to provide a new and improved, as contrasted with the prior art, motorized ski vehicle of the kind described.

A more particular object of the invention is to provide an improved power ski having improved load supporting and tracking surfaces and improved edge control or reaction surfaces for assisting in turning of the ski.

These and other objects and advantages of the invention will become apparent from the following detailed description taken in connection with the accompanying drawings in which:

Figures 1, 2:
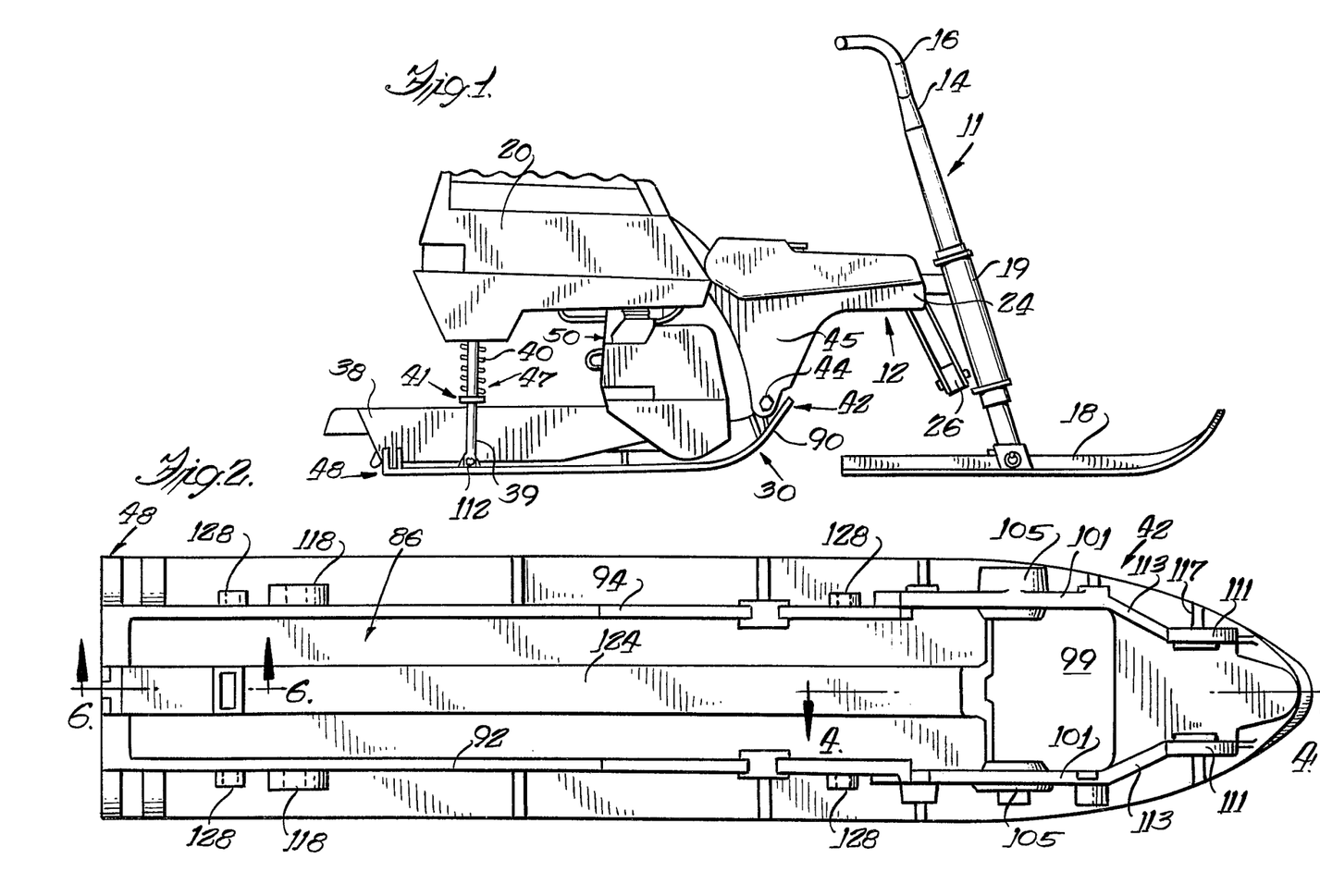
FIG. 1 is a side elevational view of a motorized ski vehicle and its power ski constructed in accordance with a preferred embodiment of the invention.
FIG. 2 is an enlarged, top plan view of a power ski which is constructed in accordance with a preferred embodiment of the invention.

As shown in the drawings for purposes of illustration, the invention is embodied in a motorized snow vehicle 11 of the snow bob kind having an upstanding main frame 12 in the forward end of which is an upright steering post 14 carrying a handlebar 16 at its upper end and a front turning ski 18 at its lower end. The rider sits on a seat 20 at the rear portion of the frame with his hands on the handlebars 16 and with his legs astride a central cross frame portion 24 with his feet resting on a transversely extending footrest bar 26 disposed near the lower end of a cylindrical frame tube 19 in which is journaled the steering post 14. The vehicle is propelled by a power ski 30 which includes an endless propulsion track 32 (FIG. 3) having a lower run 34 at which the track is in engagement with the snow and moving rearwardly and an upper return run 36 in which the track is moving forwardly across the top of the ski and within a protective housing 38 (FIG. 1). Preferably, the power ski is pivotally connected at its front end 42 by a pivot pin 44 to a central depending frame portion 45 of the main frame 12. The rear end 48 of the power ski is connected by a connecting means 47 to the rear of the frame below the seat location by means of a pair of telescoping tubes 39, a biasing spring 40 and a shock absorber 41 extending vertically between the rear end of the power ski and the underside of the seat. With this pivotal construction at the front end of the power ski and movable cushioned constructing means 47 at the rear end of the connecting means, the person or persons sitting on the seat 20 will be cushioned from some of the shocks and up and down movements of the power ski as it travels across rough terrain.

The preferred manner of powering the propulsion track 32 is by a gasoline engine 50 disposed beneath the seat 20 and supported by the power ski 30 at a location over a front drive sprocket 52 (FIGS. 3 and 5) which drives the propulsion track 32. A 3.7 cubic inch displacement, two-cycle engine has been found to adequately propel a ski bob embodying this invention. Preferably, a drive belt (not shown) driven by the output shaft of the motor extends to and drives a drive wheel 54 (FIG. 5) which is connected to the drive sprocket 52 by an intermediate shaft. Suitable cable controls (not shown) extend from the handlebar 16 to the motor 50 allowing the operator to control the acceleration and braking of the engine and thereby the propulsion track 32.

In the early design of these ski bob kinds of vehicles, the power ski had a generally flat planar undersurface with the propulsion track sliding rearwardly along the planar undersurface; the propulsion track was similar to that disclosed herein and included a continuous chain 58 to which are attached transversely extending resilient cleats 60 which depend from the small, central chain which was mounted for travel between the front drive sprocket 52 and a rear return sprocket 62. In these earlier snow bobs, the cleats were about as wide as the ski and extended their full height beneath the ski and, as a result, the cleats bore most of the rear weight when on hard ice or snow. The cleats bent and where overstressed, particularly on hard surfaces such as ice or packed snow, when stressed by the chain to do the propeling. Furthermore, in such snow bobs there were ineffective tracking surfaces or reaction surfaces as the ski was disposed substantially above the cleats, providing little snow surface engagement under some conditions. Since this earlier ski bob development, it has been suggested that a tunnel be formed in the underside of the power ski through which the chain and a portion of the cleats pass. The tunnel is formed by providing a pair of narrow depending side skirts immediately adjacent the longitudinal sides of the power ski undersurface being swept by the cleats. This structure provides a wide wall to prevent lateral movement of the snow against which a cleat bears and affords a pair of narrow sled runner-like appendages for taking some of the load off the cleats particularly when the power ski is resting on ice or other hard surfaces; but in soft snow, the narrow sled runner skirt surfaces provide a very small or limited support area for the rear portion of the ski bob.

Figures 7, 8, 9:
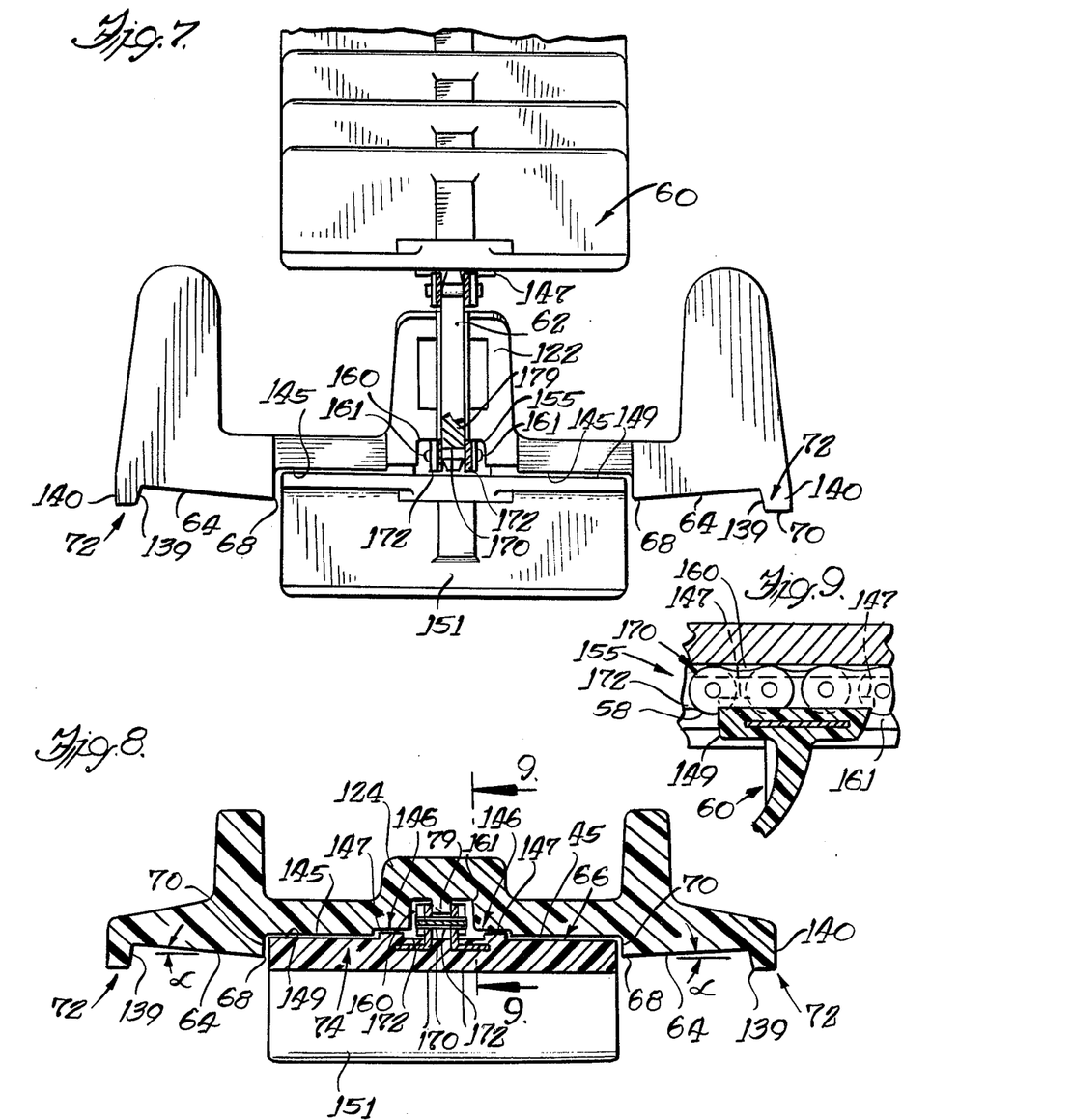
FIG. 7 is a rear end view shown partially in section of the power ski.
FIG. 8 is a cross-sectional view taken substantially along the line 8—8 of FIG. 3.
FIG. 9 is an enlarged sectional view taken substantially along line 9—9 of FIG. 8.

In accordance with the present invention, the power ski 30 achieves improved tracking, load supporting and turning capabilities by a unique design of its undersurface. More specifically, and as best seen in FIG. 8, the undersurface of the power ski is provided with a pair of wide tracking or running surfaces 64 on opposite sides of a central propulsion track receiving tunnel 66 and inward of outer edge control flanges 72. The running surfaces have a sufficient transverse width and longitudinal length to define substantial support areas to support the weight of the vehicle in soft snow or the like.

It is believed that the percentage of the total area, as projected to a horizontal plane, at the underside of the ski which is accounted for by the running surfaces 64 and the bottom surface of the outer edge control flanges 72 should be in the range of about 45 to 65 percent and preferably about 55 percent. Improved stability and improved turning capability is provided by inclining these tracking surfaces 64 to form sharp cornered inner reaction edges 68 inwardly from the outer edge control flanges 72, for example, at the juncture between a running surface and a vertical side wall 70 defining an outer and vertical side for the tunnel 66. That is, the tracking surfaces 64 are inclined upwardly and outwardly relative to a true horizontal plane in the transverse direction between the inner reaction edges 68 and a pair of outer depending edge control flanges 72. These edge control flanges 72 extend longitudinally of the ski and generally parallel to the inner reaction surfaces 68 and co-operate therewith, particularly when the rider leans into a turn, to prevent the ski from sliding in a wide arc thereby enabling a closer and tighter turn to be made with the power ski.

Some of the load on the power ski is also supported by the cleat-swept portion of the undersurface of the ski. In the preferred embodiment, the cleat-swept portion of the ski is the horizontal projection of the surfaces within the tunnel wherein the cleat is located.

The cleats 60 are subjected to relative rugged conditions and tend to wear under the forces being applied thereto by the weight of the occupant and the propulsion force from the engine when sliding along the undersurface of the ski. The power ski 30 has overcome several severe wear problems. More specifically, it has been found that the cleats 60 slap or bear with high pressures against the entry end 73 (FIG. 4) of a tunnel roof wall 74 as the projecting cleats 60 are transisting from the relatively unconfined curved path of travel about the front sprocket 52 and into the confined straight path of travel within the tunnel; and likewise that the cleats bear with high pressure against the exit end 75 (FIG. 3) of the tunnel's roof wall 74 as the cleats 60 begin to leave the end of the straight run and to travel in a curved path about the rear sprocket 62. This slapping or high pressure contact between the cleats 60 and the tunnel roof wall 74 results in frictional wear of the cleats. It appears that acceleration forces as well as centrifugal forces generated during turning of the cleats, which are flexible and relatively long and bend during turning, causes this increased pressure and resultant wear. This wear problem has been overcome by the provision of cleat spacing and stabilizing means on the ski undersurface to stabilize, that is, guide and position, the cleats at the entry and exit ends 73 and 75 of the tunnel before the cleat is positioned close to the tunnel roof wall 74 to reduce the above-described friction caused wear of the cleats 60 on the tunnel's roof wall 74. Specifically, means in the form of an increased height chain guide ridge 79 or a lowered chain groove top surface 160 (FIG. 4) at the entry end 73 of the tunnel holds the cleats farther outwardly from the tunnel roof wall 74 at the entry end; and at the rear section 80 (FIG. 6) of the tunnel, tunnel wall 74 has been relieved upwardly relative to the rear portion of the chain guide ridge 79 or surface 160 of chain groove 155. Thus, at the entry and exit ends of the tunnel, the inner sides of the cleat 60 are positioned differently relative to the roof wall 74 than during the long central portion of the tunnel, as will be explained in greater detail hereinafter.

Figure 3:
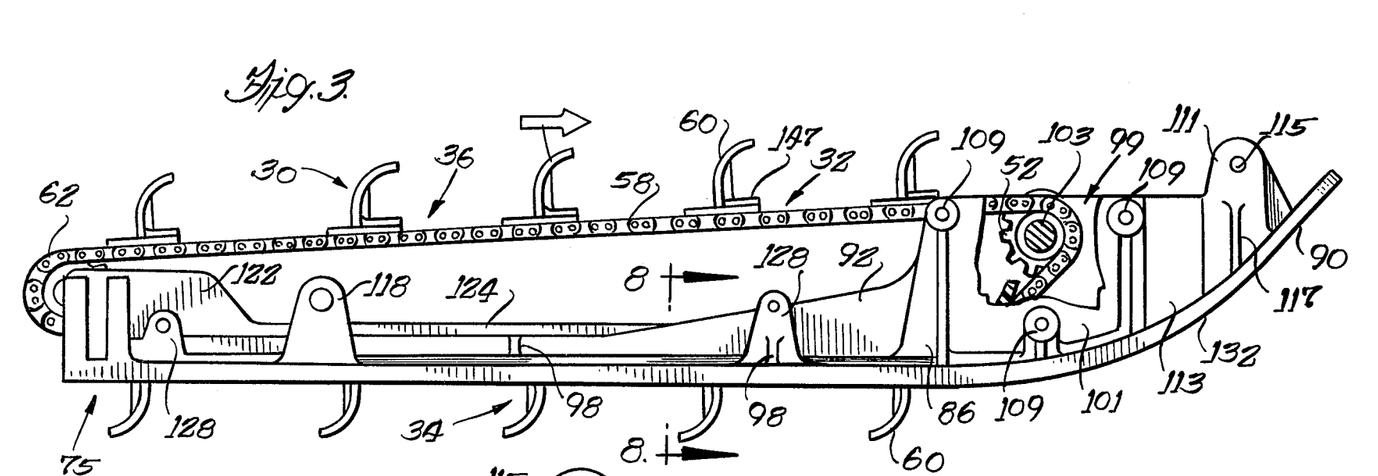
FIG. 3 is a side elevational view of the power ski shown in FIG. 2.
Figures 5, 6:
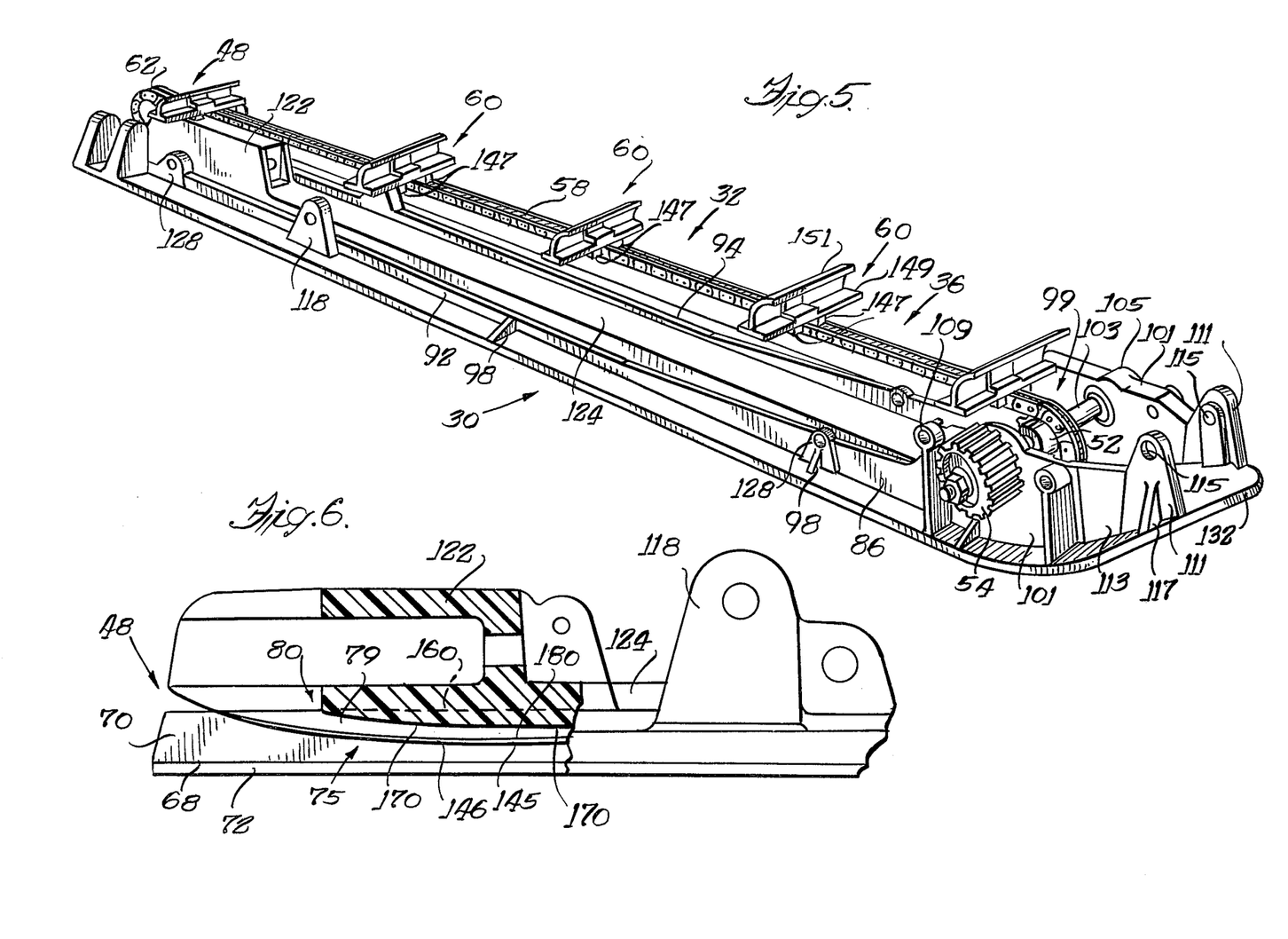
FIG. 5 is a perspective view of a power ski constructed in accordance with the preferred embodiment of the invention.
FIG. 6 is a cross-sectional view taken substantially along the line 6—6 of FIG. 2.

Referring now in greater detail to the illustrated embodiment of the invention, the power ski 30 is preferably formed with a structurally strong and rugged body 86, as best seen in FIGS. 3 and 5, which is molded of a strong plastic or synthetic material such as glass reinforced nylon. The power ski must be rugged as it is subjected to shocks when hitting obstacles at speeds up to 20 mph and supporting a substantial portion of the rider's weight, which may be as much as 250 pounds, as well as a substantial portion of the vehicle's weight which may be as much as 40 to 50 pounds. Further, in this illustrated embodiment of the invention, the power ski body 86 supports the motor 50 and journals the front and rear sprockets 52 and 62 as well as guiding the propulsion track 32. The ski body is formed with an upwardly curved and pointed front tip 90 and an elongated body terminated in a rectangular rear end 75. On the upper side of the ski body 86 are molded a pair of parallel ribs or walls 92 and 94 which extend generally longitudinally of the ski and which are reinforced by cross ribs 98 (FIG. 3).

A relatively large central opening or well 99 is provided at the front end of the ski body 86 at the front sprocket area. The opening 99 provides a passageway for the cleats 60 to transition from the upper run 36 to the lower run 34 and is in part defined on opposite sides by a pair of buttressed main support walls 101 supporting front sprocket drive shaft 103. These support walls have circular bearing receiving bosses 105 molded therein into which are mounted bearings for rotatably supporting the front sprocket drive shaft 103. These main support walls 101 are also provided with several bores 109 into which are inserted bolts to fasten the engine 50 to the ski body by means of suitable mounting plates and brackets (not shown).

The front end of the ski body also is constructed to have sufficient strength to be pivotally mounted by the pivot pin 44 to the frame 45. To this end, a pair of upstanding lugs 111 are molded integrally with the longitudinally extending main support walls 101 and are connected thereto by thick cross-sectional portions 113. The lugs 111 have apertures 115 to receive the pivot pin 44. Suitable cross ribs 117 are located beneath the apertures 115 to provide additional strength in this pivotal connection area.

Toward the rear end of the ski body 86, a pair of upwardly extending apertured lugs 118 are attached to the ski body and are apertured to receive suitable nut and bolt fasteners 112 to secure the lower ends of the telescoping tubes 39 of the cushioned connecting means 47. Rear sprocket 62 is rotatably mounted on an adjustable threaded stem to provide a chain tensioning device, not shown, which device is mounted in a hollow tube-shaped housing 122 located at the rear end of the ski body. The chain tensioning device cooperates with chain 58 to provide proper adjustment for such chain. The housing 122 is centrally located over the chain-receiving groove 155 of tunnel 66 and is aligned longitudinally with an upstanding wall section 124 of the tunnel 66. Upper cover housing 38, which covers the upper run of the propulsion track 32 to avoid catching a person's clothing or body thereon, is connected at its forward and rearward ends, respectively, to upstanding and apertured bosses 128, such bosses being formed integrally with the ski body.

It will be appreciated that this upper configuration of the power ski 30 may be changed substantially depending upon the manner and location of the various parts and mechanisms carried by or connected to the power ski 30. Manifestly, such changes may be made to a power ski which still fall within the purview of the claims of the present invention.

Turning now to the undersurface of the power ski, it will be seen, as shown in FIG. 8, that the running surfaces 64, control edges 68 and edge flanges 72 are all integrally formed on the ski body 86. It is to be understood, however, that additional wear or metallic surfaces could be added to the integral body. But from a cost and weight standpoint, it is preferred that the power ski be primarily molded in one piece without the additional other materials.

Figure 4:
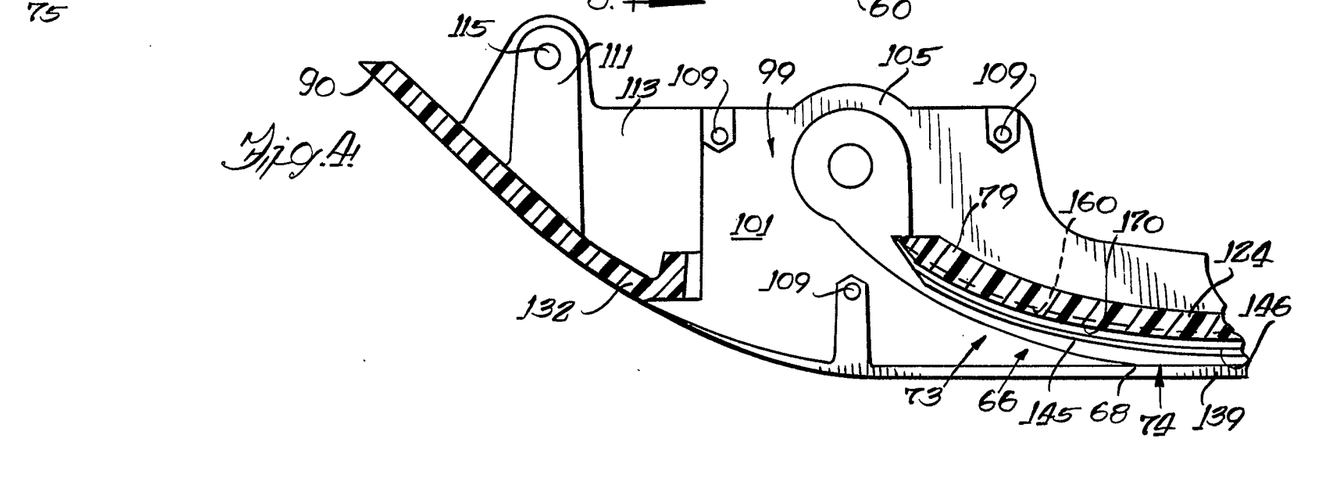
FIG. 4 is an enlarged sectional view taken substantially along line 4—4 of FIG. 2.

The illustrated running surfaces 64 have been inclined at an angle $\alpha$ in the range of between 2 to 20 degrees to the horizontal with an angle of 5 to 10 degrees to the horizontal being preferred. The inclined running surfaces 64 thus form an acute angle of less than 90 degrees at the corner defining the inner reaction edges 68. The running surfaces 64 intersect, at their outboard edges, inner vertical wall 139 of edge control flange 72. Inner wall 139 may be vertical, but preferably is oriented at substantially 90° from running surface 64. The running surfaces 64 extend longitudinally from the rearward end of the ski body 86 to the well opening 99 where they are reduced in width but continue forwardly beneath the main support walls 101 for the front sprocket at which point they meet the curved tip's bottom surface 132 (FIG. 4).

As best seen in FIGS. 7 and 8, the outer edge control flanges 72 project downwardly along the outer edges of the ski body 86 relative to the running surfaces 64 and extend longitudinally for substantially the full length of the ski's undersurface between the curved front tip 90 to the rearward end of the ski body 86. Preferably, the control flanges 72 also extend into and have front inwardly curved ends in the upwardly curved front tip surface 132. The edge control flanges 72 are spaced sufficiently from the tunnel 66 so that they do not function to retain snow in the tunnel as in some other power skis. Likewise, the edge control flange 72 do not have a primary function to supporting weight but have as their nomenclature indicates the function of assisting in controlling of turning and tracking. By way of example only, the illustrated edge control flanges 72 are relatively narrow, for instance, 0.19" in width. Herein, the flanges are slightly larger in height than their 0.19 inch width.

In this illustrated embodiment of the invention, the width of the power ski is about 6" with the central tunnel 66 width, as projected to a horizontal plane, being about one-half of the width of the ski. The tunnel 66 as referred to generally comprises surfaces 70, 145, 146, 160, 161 and ridge 79. This ratio may be varied depending on how much weight is desired to be supported by the running surfaces 64. Thus, for example, the total surface area of running surfaces 64 may be increased by increasing the width of these running surfaces if it is desired to support more weight thereon. In this illustrated embodiment of the invention, the width of each running surface 64 is about 1.22" and the length thereof is approximately 22 to 23 inches with the total length of the power ski being approximately 30 inches.

Referring now in greater detail to the illustrated track-receiving tunnel 66, as best seen in FIGS. 7 and 8, the roof wall 74 comprises a first pair of flat, horizontal roof surfaces 145 which extend longitudinally the length of the ski body from the rear thereof up to opening 99 and are swept with minimal clearance by the proximate sides of the cleats 60 passing along these roof surfaces. Herein, these roof surfaces 145 are about 1.00" in width. As best seen in FIGS. 8 and 9, the tunnel roof wall 74 further comprises a pair of inner recess section walls 146 against which slide pads 147 (FIG. 5) which are formed on and project upwardly of the horizontal top cross body 149 of each cleat 60, as best seen in FIG. 9. Each cleat includes this cross body 149 which is connected directly to a chain link as well as a depending, wide curved blade 151. Each of the illustrated recessed walls 146 is about 0.31 inches in width in this instance. It is intended that slide pads 147 bear on tunnel surface 146 and that clearance be maintained between cross body 149 of cleat 60 and tunnel surfaces 145 and 70.

The chain 58 travels within and is guided within a chain groove 155 which is defined by a top wall 160 and a pair of depending vertical sides 161, as best seen in FIG. 7. The chain guide groove is centered on the center line of the ski body. To further assist in guiding the chain, there is preferably molded the centrally located chain guide ridge 79 which depends from the top wall 160 into the chain guide groove 155 to engage the central roller portions of the chain while the chain side plates 172 pass on both sides of the chain guiding ridge 79. The chain guiding ridge 79 has a lower depending wall 170 along which slide the chain rollers. Herein, the chain guide ridge 79 is about 0.13 inch in width, 0.07 inch in height, and is centered in the chain guide groove 155 which is about 0.56 inch in width. In addition, the top surfaces of the chain slide plates 172 may contact and slide along top wall 160 to further assist in guiding and stabilizing the chain 58 and the lower run of propulsion track 34 within the tunnel.

Thus, it will be seen that the chain 58 and the cleats 60 are guided within the tunnel and are held against sideways displacement to define a relatively straight forward propulsion for the power ski 30 and hence for the ski bob. As previously described, the cleats 60, particularly the cleat cross bodies 149, have tended to slap against the roof wall 74 and to wear excessively because of such slapping action, particularly at the entry end 73. This wear has been alleviated by decreasing the distance between the surfaces of the tunnel against which the chain links guide and the surfaces of the tunnel against which or along which the slide pads 147 and top cross body 149 of the cleat slide. This provides clearance between the cleat, in particular the slide pads 147 and cross body 149, and the adjacent tunnel walls as the cleat enters the tunnel; thereby allowing the chain link, which is attached to the cleat, to stabilize in the chain groove 155 before the slide pads 147 and top cross bodies 149 move into close proximity to the surfaces 146 and 145. Of course, when the chain link, which is attached to the cleat, is stabilized, the cleat itself is stabilized. Such clearance can be provided by increasing the height of the chain ridge 79 at the entry end of the tunnel 66 and/or decreasing the height of vertical sides 161 at that location with respect to tunnel surfaces 145 and 146. In other words, the distance between surface 170 and surface 146 is decreased, as is the distance between surface 170 and surface 145. In addition, the distance between surface 160 and surfaces 145 and 146 has been reduced so that the chain links contact surface 160 before slide pads 147 contact surface 146.

At the exit end of the tunnel 66, as best seen in FIG. 6, the surfaces 145 which are nominally spaced from the top side of cleats 60 and the adjacent surfaces 146 for engaging the top sides of the cleat pads 147 are relieved relative to the outer wall 170 of chain guide 79 and top wall 160 of chain groove 155 to reduce the frictional resistance and wear of the cleats on the ski body 86 as the cleats begin to travel in a curved path upwardly toward the rear sprocket 62. More specifically, these tunnel surfaces 145 and 146 begin to curve upwardly and rearwardly from points of tangency 180 and are spaced upwardly relative to chain guide ridge 79 and chain groove wall 160 to provide clearance between the cleat and the tunnel surfaces 145 and 146. Herein, the radius of curvature for tunnel surfaces 145 and 146 is about 12 inches and the surfaces are relieved in an upward direction about 0.280 inches in the distance from their points of tangency 180 to the end of surfaces 145 and 146. When the power ski is unweighted, a slight space can be seen to exist between these surfaces 145 and 146 and the top sides of the cleats at the exit end of the tunnel 66. While it is not noticeably evident from the illustrations herein, the pivot pin 44 holds the front end 42 of the power ski at a slightly raised elevation relative to the rear end 48 of the power ski to assure that the rearward half of the power ski is in better driving engagement with the snow with the rider's weight concentrated over the power ski. With this weight concentration, it has been found that the relieving of the surfaces 145 and 146 is particularly desirable to reduce wear.

The illustrated propulsion track is formed with a chain 58 and separate cleats formed of an elastomeric material which are secured to chain at spaced locations. The propulsion track may, of course, be made of a more integral construction having an integral one-piece endless band with integrally molded cleats thereon, the cleats and band both being formed of an elastomeric material. Likewise, the particular cup-curved shape for the cleats 60 may be changed from that illustrated to other shapes such as more flat bar-shaped cleats. The power ski of the present invention is thus not intended to be limited to the particular track constructions described herein as other constructions may fall within the purview of the appended claims.

From the foregoing, it will be seen that the present invention provides a ski bob having a power ski with running surfaces inboard of the outer edge control flanges and outboard of the central propulsion track. By inclining these running surfaces with respect to a horizontal plane and a vertical wall of the tunnel, interior reaction edges have been formed to co-operate with the pair of outboard edge control flanges. Wear problems encountered at the entry and exit ends of the track receiving tunnel have been overcome by providing additional clearance for the cleats relative to the tunnel roof. The ski body may be made with these features in an inexpensive manner by moulding the same with these surfaces therein.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a power driven ski vehicle having an upstanding cycle-like frame with a front ski steerable by a handlebar and with a rear sheet beneath which is a power driven ski driven by a motor wtih an endless propulsion track mounted on said power ski for movement along the underside of the ski to engage the snow and to propel the vehicle forward, the improvement comprising: means on the underside of said power ski defining a longitudinally extending tunnel opening towards the snow for receiving and guiding the propulsion track traveling longitudinally within said tunnel, a roof portion on said tunnel supporting a substantial portion of the rider's weight, outer depending flanges at the longitudinal outer side of the power ski providing turning edges therefor, and a longitudinally extending running surface located on each side of the tunnel for supporting a substantial portion of the weight of the rider and being located a level intermediate the level of said tunnel roof portion and said turning edges, each of said running surfaces being located inwardly with respect to said turning edges for supporting and sliding engagement with the snow.

2. A power driven ski vehicle in accordance with claim 1 having a pair of inner longitudinally extending reaction edges substantially parallel to said outer depending flanges.

3. A power driven ski vehicle in accordance with claim 1 in which said track includes a transversely extending cleat disposed in said tunnel, said tunnel being substantially wider in a transverse dimension than either of said running surfaces.

4. A power driven ski vehicle in accordance with claim 1 in which said roof portion is engaged by said track, guide means on said power ski for guiding said track while turning into said tunnel and from said tunnel to reduce pressure on and wear of said track by the roof of said tunnel during its change of direction.

5. In a power driven ski vehicle having an upstanding frame with a front ski steerable by a handlebar and with a rear seat beneath which is a power driven ski driven by a motor with an endless propulsion track mounted on said power ski for movement along the underside of the ski to engage the snow and to propel the vehicle forward, the improvement comprising: means on the underside of said power ski defining a longitudinally extending tunnel opening towards the snow for receiving and guiding the propulsion track traveling longitudinally within said tunnel, outer depending flanges at the longitudinally outer sides of the power ski providing turning edges therefor, and a longitudinally extending running surface located on each side of the tunnel and located inwardly with respect to said turning edges for supporting and sliding engagement with the snow, said running surfaces being transversely inclined with respect to a horizontal plane to provide a lower inboard edge thereof being spaced from the outer depending flange.

6. A power ski vehicle in accordance with claim 5 in which said running surface is disposed at an angle between 2° and 20° to the horizontal.

7. A power driven ski vehicle in accordance with claim 5 in which the lower inboard edge is adjacent the tunnel and in which vertical side walls are formed on said tunnel to intersect said inclined running surfaces to define longitudinally extending reaction edges on each side of the tunnel.

8. In a power driven ski vehicle having an upstanding frame with a front ski steerable by a handlebar and with a rear seat beneath which is a power driven ski driven by a motor with an endless propulsion track mounted on said power ski for movement along the underside of the ski to engage the snow and to propel the vehicle forward, the improvement comprising: means on the underside of said power ski defining a longitudinally extending tunnel opening towards the snow for receiving and guiding the propulsion track traveling longitudinally within said tunnel, outer depending flanges at the longitudinally outer sides of the power ski providing turning edges therefor, and a longitudinally extending running surface located on each side of the tunnel and located inwardly with respect to said turning edges for supporting and sliding engagement with the snow, said track comprising an endless chain and transversely extending cleats fixed to said chain at spaced locations on said chain, said tunnel means having a roof engageable by said cleats and having chain guide means at the entrance to said tunnel to space said cleats from said tunnel roof thereat, thereby preventing undue slapping and wearing of the cleats at the entrance to said tunnel.

9. In a power driven ski vehicle having an upstanding frame with a front ski steerable by a handlebar and with a rear seat beneath which is a power driven ski driven by a motor with an endless propulsion track mounted on said power ski for movement along the underside of the ski to engage the snow and to propel the vehicle forward, the improvement comprising: means on the underside of said power ski defining a longitudinally extending tunnel opening towards the snow for receiving and guiding the propulsion track traveling longitudinally within said tunnel, outer depending flanges at the longitudinally outer sides of the power ski providing turning edges therefor, and a longitudinally extending running surface located on each side of the tunnel and located inwardly with respect to said turning edges for supporting and sliding engagement with the snow, said track comprising an endless chain and transversely extending cleats fixed to said chain at spaced locations on said chain, said tunnel including a roof portion engageable by said cleats, track guide means within the tunnel for locating the track with respect to the tunnel roof portion, and in which a rear section of said tunnel roof portion is relieved upwardly with respect to the track guide means to space the cleats from the tunnel roof portion as the cleats exit said tunnel for turning in a curved path.

10. In a power driven Ski vehicle having an upstanding cycle-like frame with a front ski steerable by a handlebar and with a rear seat beneath which is a power driven ski driven by a motor with an endless propulsion track mounted on said power ski for movement along the underside of the ski to engage the snow and to propel the vehicle forward, the improvement comprising: means defining a longitudinally extending tunnel on the underside of said power ski for receiving and guiding the endless propulsion track as the track moves rearwardly in said tunnel, track guide means in said tunnel for guiding said propulsion track for longitudinal travel from an entry end to an exit end for said tunnel, a roof surface on said tunnel being swept by said propulsion track, said roof surface having a predetermined spatial relationship to said track guide means in the central portion of said guide means and another predetermined spatial relationship at an end of said tunnel with said roof surface being relieved upwardly to relieve the pressure and wear on said track at said tunnel end.

11. In a power driven ski vehicle having an upstanding frame with a front ski steerable by a handlebar and with a rear seat beneath which is a power driven ski driven by a motor with an endless propulsion track mounted on said power ski for movement along the underside of the ski to engage the snow and to propel the vehicle forward, the improvement comprising: means defining a longitudinally extending tunnel on the underside of said power ski for receiving and guiding the endless propulsion track as the track moves rearwardly in said tunnel, track guide means in said tunnel for guiding said propulsion track for longitudinal travel from an entry end to an exit end for said tunnel, a roof surface on said tunnel being swept by said propulsion track, said roof surface having a predetermined spatial relationship to said track guide means in the central portion of said guide means and another predetermined spatial relationship at an end of said tunnel to relieve the pressure and wear on said track at said tunnel end, said another predetermined spatial relationship being defined at an exit end of said tunnel by said roof surface being upwardly relieved at said exit end of said tunnel.

12. A power driven ski vehicle in accordance with claim 11 in which said track comprises an endless chain and transversely extending cleats fastened thereto at spaced intervals, pad means on said cleats having sliding engagement with said roof surface through the central portion of said tunnel and being spaced from said roof surface at said exit end of said tunnel.

13. In a power driven ski vehicle having an upstanding frame with a front ski steerable by a handlebar and with a rear seat beneath which is a power driven ski driven by a motor with an endless propulsion track mounted on said power ski for movement along the underside of the ski to engage the snow and to propel the vehicle forward, the improvement comprising: means defining a longitudinally extending tunnel on the underside of said power ski for receiving and guiding the endless propulsion track as the track moves rearwardly in said tunnel, track guide means in said tunnel for guiding said propulsion track for longitudinal travel from an entry end to an exit end for said tunnel, a roof surface on said tunnel being swept by said propulsion track, said roof surface having a predetermined spatial relationship to said track guide means in the central portion of said guide means and another predetermined spatial relationship at an end of said tunnel to relieve the pressure and wear on said track at said tunnel end, said another predetermined spatial relationship being defined at an entry end of said tunnel by said track guide means extending downwardly a greater distance relative to said roof surface at said entry end than at the portion of the tunnel between said ends.

14. A power driven ski vehicle in accordance with claim 13 in which said track comprises an endless chain and transversely extending cleats fastened thereto at spaced intervals, and in which said guide track means includes a longitudinally extending ridge in said tunnel for guiding said chain, pad means on said cleats having sliding engagement with said roof surface through the central portion of said tunnel and said chain slides along said ridge, said ridge guiding said chain into the entry end of said tunnel prior to engagement of said pads with said roof surface.

15. A power ski comprising ski body having a forward upturned tip, an endless propulsion track mounted on said power ski for movement along the underside of said ski body to engage the snow and to return along the upper side of said ski body, means on the underside of said ski body for guiding said propulsion track for travel longitudinally of said ski body, a tunnel roof portion for supporting a substantial portion of the rider's weight, outer depending flanges extending longitudinally of said ski body providing turning edges therefor, and longitudinally extending running surfaces on the underside of the ski body located inwardly with respect to said turning edges and outwardly with respect to the propulsion track for gliding contact with the snow and for supporting a portion of the rider's weight, said running surfaces being at a level intermediate said roof portion and said turning edges and supporting a substantial portion of the rider's weight.

16. A power ski comprising a ski body having a forward upturned tip, an endless propulsion track mounted on said power ski for movement along the underside of said ski body to engage the snow and to return along the upper side of said ski body, means on the underside of said ski body for guiding said propulsion track for travel longitudinally of said ski body, outer depending flanges extending longitudinally of said ski body providing turning edges therefor, and longitudinally extending running surfaces on the underside of the ski body located inwardly with respect to said turning edges and outwardly with respect to the propulsion track for gliding contact with the snow and for supporting a portion of the rider's weight, said running surfaces being substantially wider in transverse width than said depending flanges and are transversely inclined with the lower edge thereof being spaced from the depending flange.

17. A power driven ski in accordance with claim 16 in which said means for guiding said propulsion track is a tunnel having vertical side walls which intersect said inclined running surfaces to define longitudinally extending reaction edges on each side of the tunnel.

18. In a power driven ski vehicle having an upstanding frame with a front ski steerable by a handlebar and with a rear seat beneath which is a power driven ski driven by an engine with an endless propulsion track mounted on said power ski for movement along the underside of the ski to engage the snow and to propel the vehicle forward, the improvement comprising: an outer depending flange at each longitudinal outer side of the power ski providing turning edges therefor, a longitudinally extending running surface located between each said turning edge and the track swept surface of the underside of the ski for supporting and sliding engagement with the snow, each said running surface being transversely inclined with the inboard edge thereof being lowermost, an upwardly extending wall from the inboard edge of each running surface to provide a longitudinally extending reaction edge on the inboard edge of each said running surface, means on said ski body for guiding said propulsion track along the underside of said power ski, and means on said power ski holding said propulsion track in spatial relationship to said underside of said power ski to reduce wear therebetween.

* * * * *